United States Patent [19]

Allen

[11] 4,203,853

[45] May 20, 1980

[54] FLUID FOR RECOVERING HYDROCARBONS

[75] Inventor: Joseph C. Allen, Bellaire, Tex.

[73] Assignee: Texaco Inc., White Plains, N.Y.

[21] Appl. No.: 909,734

[22] Filed: May 25, 1978

Related U.S. Application Data

[62] Division of Ser. No. 825,313, Aug. 17, 1977, Pat. No. 4,127,171.

[51] Int. Cl.$^2$ ............................................. E21B 43/22
[52] U.S. Cl. .............................. 252/8.55 D; 252/352; 252/355; 546/172
[58] Field of Search ...................... 166/260, 272, 275; 252/8.55 D, 355, 352; 546/172

[56] References Cited

U.S. PATENT DOCUMENTS

| | | | |
|---|---|---|---|
| 2,793,697 | 5/1957 | Simm et al. | 166/260 |
| 3,398,793 | 8/1968 | Milton | 166/260 |
| 3,731,741 | 5/1973 | Palmer et al. | 166/272 |
| 3,827,497 | 8/1974 | Dycus et al. | 252/8.55 X |
| 4,043,922 | 8/1977 | Palmer et al. | 252/8.55 |
| 4,134,415 | 1/1979 | Flournoy et al. | 252/8.55 X |

Primary Examiner—Herbert B. Guynn
Attorney, Agent, or Firm—Carl G. Ries; Thomas H. Whaley; Walter D. Hunter

[57] ABSTRACT

A two-step method for recovering hydrocarbons from a subterranean formation in which in situ combustion is first initiated in the formation by injection of air, for example, through an injection well, the injection of air is terminated and in a final step a combustion-supporting gas such as air, air mixed with oxygen, etc. and a combustible gas such as hydrogen, carbon monoxide and mixtures thereof are introduced into the formation preferably through separate sets of casing perforations and finally hydrocarbons are recovered via a production well.

2 Claims, No Drawings

FLUID FOR RECOVERING HYDROCARBONS

This is a division, of application Ser. No. 825,313, filed Aug. 17, 1977, now U.S. Pat. No. 4,127,171.

BACKGROUND OF THE INVENTION

1. Field of the Invention

This invention relates to a method of recovering hydrocarbons from a subterranean hydrocarbon-bearing formation, more particularly, this invention relates to a method of recovering hydrocarbons in which in situ combustion is first conducted in the formation after which a combustible gas and a combustion-supporting gas are injected into the formation in, for example, two separate intervals and oil is recovered from the formation.

2. Prior Art and Background

In recovery of petroleum from subterranean reservoirs, it usually is possible to recover only a minor portion of the petroleum in place by the so-called primary recovery techniques, that is, those techniques which utilize only the natural forces present in the reservoir. Thus, a variety of supplemental recovery techniques have been developed in order to increase the recovery of petroleum in such reservoirs. In these supplemental techniques which are commonly referred to as secondary recovery operations, although they may be tertiary in sequence of employment, energy is supplied to the reservoir as a means of moving the fluid within the reservoir to suitable production wells through which they may be withdrawn to the surface of the earth.

Secondary recovery techniques which are showing increasing promise are those which involve in situ combustion. In an in situ combustion process, a portion of the carbonaceous material within the reservoir is burned or oxidized in situ in order to establish a combustion front. The combustion front may be moved through the reservoir by either a direct or inverse drive. In a direct in situ combustion process the combustion is initiated adjacent to one or more injection wells and the resulting combustion front is advanced through the reservoir in the direction of one or more production wells by the introduction of a combustion-supporting gas through the injection well or wells. The combustion front is preceded by a high temperature zone commonly called a retort zone, within which the reservoir petroleum is heated to affect a viscosity reduction and is subjected to distillation and cracking. The hydrocarbon fluids resulting from subjecting the petroleum to such a process are displaced to the production wells where they are withdrawn to the surface of the earth. In an inverse combustion drive, the combustion front is established adjacent to the production well or wells. As the combustion supporting gas is introduced through the injection well, the combustion front advances countercurrently to the flow of such gas in the direction of the injection well. The in situ combustion procedure, whether inverse or direct, is particularly useful in the recovery of thick heavy oils (petroleum) such as viscous petroleum crude oils and the heavy tar-like hydrocarbons present in tar sands. While these tar-like hydrocarbons may exist within the reservoir in a solid or semi-solid state, they undergo a sharp viscosity reduction upon heating and in an in situ combustion process they behave somewhat like the more conventional petroleum crude oil. In situ combustion also may be employed in the recovery of hydrocarbons from oil shale.

SUMMARY OF THE INVENTION

This invention provides an improved method for recovering hydrocarbons from an underground reservoir penetrated by an injection well and a production well which comprises:

(a) establishing a burning zone in said reservoir at the face of said injection well, (b) introducing a combustion-supporting gas into said reservoir via said injection well to propogate said zone toward said production well, (c) terminating the injection of the combustion-supporting gas into the reservoir, (d) injecting into the said reservoir via said injection well a combustible gaseous mixture comprising a mixture of a combustible gas and a combustion-supporting gas, (e) effecting combustion of said mixture in the said formation thereby establishing a second burning zone which moves toward the production well and displaces hydrocarbons from the formation, and (f) recovering the displaced hydrocarbons via the said production well.

DETAILED DESCRIPTION OF THE INVENTION

The present invention may be carried out utilizing any suitable injection and production system. The injection and production systems may comprise one or more wells extending from the surface of the earth into the subterranean reservoir. Such injection and production wells may be located and spaced from one another in any desired pattern. For example, a line drive pattern may be utilized in which a plurality of injection wells and a plurality of production wells are arranged in rows which are spaced horizontally from one another. Exemplary of other patterns which may be used are the so-called circular drive patterns in which the injection system comprises a central injection well and the production system comprises a plurality of production wells spaced about the injection well. Typical circular drive patterns are the inverted five spot, seven spot, and nine spot patterns. The above and other patterns are well known to those skilled in the art and for a more detailed description of such patterns references made to Uren, L. C., Petroleum Production Engineering-Oil Field Exploitation, Second Edition, McGraw, Hill Book Company Incorporated, New York and London, 1939. While the well patterns described in Uren are with reference to water flooding operations, it will be recognized that such patterns are also applicable to the procedure described herein.

The in situ combustion step in the process of my invention is carried out by a conventional manner using known techniques. For example, a combustion supporting gas such as oxygen as contained in air or a mixture of air and oxgyen, for example, is injected into the injection well or wells and is forced through the formation to the production wells. Next, ignition of reservoir hydrocarbons and the oxygen or air and oxygen mixture is initiated by conventional methods and once combustion is attained the combustion front is propogated through the formation toward the production wells. As this in situ combustion operation proceeds, the heat from the operation lowers to the viscosity of the inplace hydrocarbons which are moved toward the production wells where they are produced.

After the first step in the process of this invention, i.e., the in situ combustion step has been operated for a period of about 30 to about 120 days or more and after the combustion zone has propogated for some distance away from the well bore, i.e., from 10 to about 100 ft. or more, injection of the combustion-supporting gas, which can be air, an air and oxygen mixture, etc. is terminated and, if desired, the unconsumed combustion-supporting gas behind the combustion zone using an inert gas such as nitrogen, carbon dioxide, etc.

In the next step of the process of this invention which is also a combustion step, air or a mixture of oxygen and air is simultaneously injected into the formation along with a combustible gas which can be, for example, natural gas, hydrogen, carbon monoxide, etc. or a mixture of hydrogen and carbon monoxide as obtained from a synthesis gas generator. If a hydrogen-carbon monoxide mixture obtained from a synthesis gas generator is employed as the combustible gas, the ratio of hydrogen to carbon monoxide by volume will depend on the type of fuel employed as feed for the generator. During this second step when utilizing a hydrogen-carbon dioxide mixture, additional hydrogen is formed by reaction between the carbon monoxide and the in place steam. The two steps of the process, i.e., the first in situ combustion step in which a combustion-supporting gas alone is injected into the formation and the second in which a combustion-supporting gas, such as air and a combustible gas as a mixture of hydrogen and carbon monoxide, are injected simultaneously into the formation, may be repeated in a cyclic manner, as desired.

A preferred method of operating the second step of the process of this invention would be to first initiate in situ combustion for a period of about 60 days followed in the second step by the simultaneous injection of air and a mixture of hydrogen and carbon monoxide. Preferably, in the second step, the gases, i.e., air and the mixture of hydrogen and carbon monoxide would be injected into the well in separate streams and through separate sets of casing perforations into two separate intervals of the formation. In such a system, the two sets of casing perforations would be separated by a packer with one gas being injected into the tubing set on the packer and the other gas into the annulus between the tubing and the casing. Utilizing the method of this invention would increase the combustion zone temperature over that obtainable by in situ combustion alone by several hundred degrees fahrenheit, i.e., to about 1500° to about 2000° F.

In another embodiment of this invention the heat stored in the formation at the end of the second combustion step may be recovered by injecting water as a drive fluid into the heated formation. The water injected into the hot formation in this step is all or partially converted into steam which diplaces more of the in place oils through the formation and results in the recovery of additional oil via the production well.

If desired, the water injected via the injection well may contain from about 0.001 to about 0.50 weight percent or more of an interfacial tension reducer in order to increase the oil recovery. Alkaline fluids may also be injected via the injection well in the process of this invention. The drive water is made alkaline by the addition of sodium hydroxide or potassium hydroxide to the water in an amount sufficient to give a concentration of about 0.01 to about 0.1 weight percent based on the total drive water weight.

Interfacial tension reduces which are highly useful in the process of the invention include sulfated compounds of the formula:

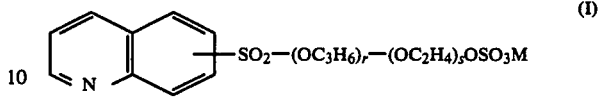

wherein r is an integer of from 2 to about 5, s is an integer of from 8 to about 60 and M is selected from the group consisting of hydrogen, sodium, potassium and the ammonium ion and compounds of the formula:

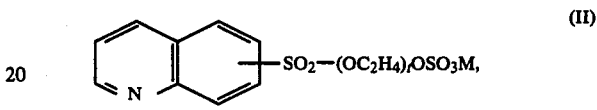

wherein t is an integer of from 8 to about 40, and M has the same meaning as previously described.

Interfacial tension reducers of this type can be formed by sulfating compounds of the formula:

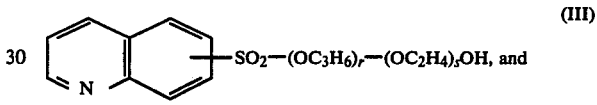

where r and s have the same meaning as before and compounds of the formula:

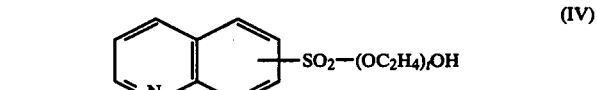

where t has the same meaning as before, batchwise with, for example, chlorosulfonic acid in a glass lined kettle at about 30° C. followed by reaction with the corresponding base, if desired. The corresponding starting compounds (II) can be prepared in the same manner as described in U.S. Pat. No. 3,731,741 employing as starting aromatic the compounds 8-quinolinesulfonyl chloride, 6-quinolinesulfonyl bromide, etc., as initiators and reacting the initiator first with the necessary amount of propylene glycol of the required molecular weight followed by the necessary amount of ethylene glycol of the required molecular weight. These same oxyalkylated derivatives (II) can be prepared using the corresponding alkylene oxides by processes well known in the art. The quinoline starting material may also be substituted by other innocuous groups such as alkoxy of from 1 to 4 carbon atoms, alkyl, etc.

Sulfonated derivatives of these same oxyalkylated quinoline compounds which are also useful as solubilizing agents in the process of this invention can likewise be prepared by reacting the above-described sulfated products with sodium sulfite at temperatures of about 150° to about 200° C. or more for about 5 to 10 hours. The sulfonated compounds and their metal and ammonium salts suitable for use as solubilizing agents in the drive fluid of this invention include compounds of the formula:

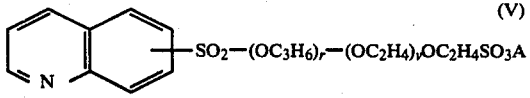

(V)

wherein r is an integer of from 2 to about 5 and v is an integer of from about 5 to about 60 and wherein A is selected from the group consisting of hydrogen, sodium, potassium, and the ammonium ion and compounds of the formula:

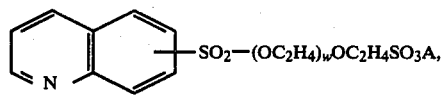

(VI)

wherein w is an integer of from 8 to about 40 and A has the same meaning as previously described.

The present invention will be more fully understood by reference to the following description of one embodiment thereof. A hydrocarbon bearng formation is penetrated by an injection well which is spaced apart from an injection well. The wells are of a suitable type for carrying out a procedure of forward in situ combustion for recovering hydrocarbons from the formation. The injection well and the production well each has a casing which extends from the earth's surface down into the lower portions of the formation. The bottom of the casing of each well is sealed by a casing shoe. The injection well is equipped with tubing which extends through the well head downward to adjacent the lower extremity of the casing. A packer is positioned on the tubing in the injection well at a point opposite the producing formation and between two separate sets of casing perforations, i.e., an upper and a lower set of perforations, both opposite the hydrocarbon bearing formation and in communication therewith. The production well has a single set of perforations through the casing wall opposite the hydrocarbon bearing formation. The injection well by virtue of the packer previously described and the two separated sets of casing perforations provide two segregated fluid entry avenues. Fluids introduced through the well head and into the annulus between the tubing and casing arc in communication with the upper area of producing formation via the upper set of casing perforations while fluids introduced through the well head via the tubing are in communication with the lower area of the producing area via the lower set of casing perforations. An in situ combustion front is begun by injecting air into the injection well via the annulus between the tubing and casing and then into the formation via the upper casing perforations and via the tubing and into the formation through the lower casing perforations. The hydrocarbons in the reservoir are ignited by conventional techniques such as by using electrical igniter. Air injection is continued for about 40 days and at the end of that time the air injection is terminated. In the next step air is injected via the injection well into the annulus between the tubing and the casing and into the formation through the upper set of casing perforations and a mixture of carbon monoxide and hydrogen (about 38 percent carbon monoxide by volume) at a temperature of about 400° F. is injected into the formation via the tubing and of the injection well through the lower set of casing perforations. Ignition is instantaneous and injection of the air and mixture of carbon monoxide is continued for 30 days. In the next step, water is injected into the formation via the annulus in the injection well and through the upper set of casing perforations for a period of about 45 days during which time hydrocarbons displaced through the formation enter the wellbore of the casing of the production well through the casing perforations and are recovered via the production well.

What is claimed is:

1. A fluid for use in recovering hydrocarbons comprising water containing from about 0.001 to about 0.50 weight percent of an interfacial tension reducer of the formula:

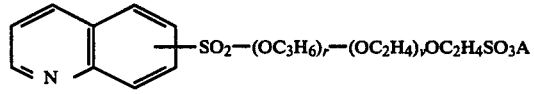

wherein r is an integer of from 2 to about 5, v is an integer of from 5 to about 60 and A is selected from the group consisting of hydrogen, sodium, potassium and the ammonium ion.

2. The fluid of claim 1 made alkaline with 0.01 to about 0.1 weight percent of an alkaline agent selected from the group consisting of sodium hydroxide and potassium hydroxide.

* * * * *